US005318718A

United States Patent [19]

Seiter et al.

[11] Patent Number: 5,318,718

[45] Date of Patent: Jun. 7, 1994

[54] PROCESS FOR THE PRODUCTION OF A POURABLE PHOSPHATE-FREE FOAM-INHIBITING PREPARATION

[75] Inventors: Wolfgang Seiter, Neuss; Herbert Reuter, Erkrath; Edmund Schmadel, Leichlingen, all of Fed. Rep. of Germany

[73] Assignee: Henkel Kommanditgesellschaft auf Aktien, Duesseldorf, Fed. Rep. of Germany

[21] Appl. No.: 920,379

[22] PCT Filed: Feb. 6, 1991

[86] PCT No.: PCT/EP91/00225

§ 371 Date: Aug. 17, 1992

§ 102(e) Date: Aug. 17, 1992

[87] PCT Pub. No.: WO91/12306

PCT Pub. Date: Aug. 22, 1991

[30] Foreign Application Priority Data

Feb. 15, 1990 [DE] Fed. Rep. of Germany ....... 4004687

Jun. 21, 1990 [DE] Fed. Rep. of Germany ....... 4019753

[51] Int. Cl.[5] ....................... B01D 19/04; C11D 7/60; C11D 11/00

[52] U.S. Cl. ............................... 252/174.15; 252/135; 252/174.14; 252/174.17; 252/174.18; 252/321; 252/358

[58] Field of Search ................... 252/174.15, 321, 358, 252/174.14, 174.17, 174.18, 135

[56] References Cited

U.S. PATENT DOCUMENTS 3,933,672 1/1976 Bartolotta et al. .................. 252/116
4,419,260 12/1983 Reuter et al. ........................ 252/321
4,894,177 1/1990 Starch ............................ 252/174.15
5,002,695 3/1991 Schulz et al. ....................... 252/321

FOREIGN PATENT DOCUMENTS 0013028 7/1980 European Pat. Off. .
0097867 1/1984 European Pat. Off. .
2338468 2/1974 Fed. Rep. of Germany .
3128631 2/1983 Fed. Rep. of Germany .
3436194 4/1986 Fed. Rep. of Germany .
2009223 6/1979 United Kingdom .

*Primary Examiner*—Paul Lieberman
*Assistant Examiner*—Ardith Hertzog
*Attorney, Agent, or Firm*—Ernest G. Szoke; Wayne C. Jaeschke; Henry E. Millson, Jr.

[57] ABSTRACT

A process for the production of pourable foam inhibitor granules comprising forming an aqueous solution of a mixture of an alkali metal carboxymethyl cellulose and a nonionic cellulose ether and maintaining the aqueous solution at slightly elevated temperature until the viscosity is at least 60% of the viscosity obtained by complete swelling of the solution, adding a water insoluble foam inhibitor and a phosphate-free mixture of at least two of an alkali metal silicate, an alkali metal carbonate and an alkali metal sulfate into the aqueous mixture which is then spray-dried to form the pourable foam inhibitor granules.

The invention also relates to the pourable foam inhibitor granules produced by the above process.

16 Claims, No Drawings

PROCESS FOR THE PRODUCTION OF A POURABLE PHOSPHATE-FREE FOAM-INHIBITING PREPARATION

This invention relates to a process for the production of a granular foam-inhibiting preparation containing a foam-inhibiting agent, a solid phosphate-free carrier material and a cellulose ether mixture.

DE 23 38 468 A1 (US-A-3,933,672) relates to a detergent containing a silicone foam inhibitor which is protected against interaction with surface-active ingredients of the detergent. For its production, aqueous melts containing the silicone foam inhibitor and a carrier impermeable to surfactants, such as polyglycols or highly ethoxylated alkyl polyglycol ethers, are first spray-dried and the particles obtained are subsequently provided with a coating in a fluidized bed. Salts typically used in detergents, more particularly tripolyphosphate or carboxymethyl cellulose, may be used as the coating material. A multistage production process such as this is relatively complicated. In addition, the phosphate content is problematical. It has also been found that the shell material only releases the foam inhibitor with delay at low washing temperatures and the undissolved particles can become caught up in the washing where they can cause greasy stains.

DE 31 28 631 - A1 describes the production of foam-inhibited detergents containing microencapsulated silicone foam inhibitors. The silicone is dispersed in an aqueous solution of a film-forming polymer and the dispersion is delivered to the spray-drying tower through a separate pipe, i.e. separately from the other detergent ingredients dissolved or dispersed in water. The two streams are combined in the spray nozzle. The film-forming polymer may be selected, for example, from cellulose ethers, starch ethers or synthetic water-soluble polymers and mixtures thereof. The microcapsules are formed spontaneously in the spray nozzle or by preliminary precipitation by addition of electrolyte salts to the silicone dispersion. The described process is confined to the production of spray-dried detergents and cannot be applied to detergents and cleaning preparations produced by other methods, for example by granulation, or even in other fields of application.

EP 97 867 - A2 describes a process for the production of microencapsulated foam-inhibiting oils by mixing of a silicone emulsion with an aqueous solution of carboxymethyl cellulose and precipitation of the microcapsules by addition of electrolytes, more particularly polyvalent salts, or organic solvents. It has been found that the production of the silicone dispersion requires the presence of non-ionic surfactants having an emulsifying effect. However, this addition leads to a distinct reduction in foam-inhibiting activity. In addition, considerable difficulties are involved in homogeneously dispersing the small quantities of silicone microcapules required for adequate foam inhibition in a comparatively large quantity of washing powder. In addition, the continuous mixing process is complicated by electrostatic charging of the particles in the transport and metering units.

DE-A-34 36 194 - A1 describes a process for the production of pourable foam-inhibiting granules by spray-drying of an aqueous foam-inhibiting dispersion containing film-forming polymers. To produce granules consisting of a) 1 to 10% by weight water-insoluble foam inhibitor, b) 0.2 to 2% by weight of a mixture of sodium carboxymethyl cellulose and methyl cellulose in a ratio by weight of 80:20 to 40:60, c) 70 to 90% by weight inorganic carrier salts soluble or dispersible in water, d) balance water, an aqueous solution containing 0.5 to 8% by weight of the cellulose ether mixture (b) is allowed to swell at a temperature of 15° to 60° C. until the viscosity of the solution is at least 75% of the viscosity measured after complete swelling of the cellulose ether solution, after which the foam inhibitor (a) is dispersed in the solution and the homogenized dispersion is spray-dried after addition of the carrier salts and, optionally, water.

Organopolysiloxanes, paraffins and mixtures of organopolysiloxanes and paraffins are used as the foam inhibitor. The foam inhibitor content is between 1 and 10% by weight and preferably between 3 and 7% by weight. The carrier salt preferably consists of a mixture of sodium silicate, sodium tripolyphosphate and sodium sulfate. The preparation described in the Example contains (in addition to other ingredients) 5.5% by weight of a silicone foam inhibitor and 31.5% by weight sodium tripolyphosphate.

It has now been found that the preparations described in DE-A 34 36 194 Al can be considerably improved in their foam-inhibiting effect and ecological compatibility by following the teaching according to the present invention.

The first problem was to replace the tripolyphosphate in the carrier salt by P-free salts. However, it was found that replacement by sodium sulfate and/or sodium silicate has an unfavorable effect, particularly when relatively large amounts, for example 8% by weight and more, of organopolysiloxane foam inhibitors are to be incorporated. On the other hand, it has been found that with increasing content of polysiloxane foam inhibitors in the granules, their effect increases overproportionally in subsequent use. Accordingly, the necessary quantities of polysiloxanes can be distinctly reduced without any loss of foam-inhibiting activity providing granules having a relatively high content of adsorbed polysiloxane foam inhibitors are used. However, where the individual salts or salt mixtures described in DE 34 36 194 are used in the absence of phosphates, the flow properties of the granules deteriorate if the content of polysiloxane foam inhibitor is more than 7.5% by weight and, in particular, more than 10% by weight. In this range, the granules tend to adhere to one another and to exude the polysiloxane.

The invention described hereinafter avoids these disadvantages and provides for the production of free-flowing, storable foam inhibitor granules having a high content of active substance and an improved foam-inhibiting effect, based on the quantity of foam inhibitor used.

The present invention relates to a process for the production of pourable foam inhibitor granules containing (a) a water-insoluble foam inhibitor from the class or organopolysiloxanes containing fine-particle silica and mixtures thereof with paraffin oil and/or paraffin wax, (b) 0.2 to 3% by weight of a mixture of sodium carboxymethyl cellulose and a nonionic cellulose ether in a ratio by weight of 80:20 to 40:60, (c) 70 to 90% by weight inorganic carrier salts soluble or dispersible in water, (d) balance water, in which an aqueous solution containing 2 to 8% by weight of the cellulose ether mixture (b) is allowed to swell at a temperature of 15° to 60° C. until the viscosity of the solution is at least 60% of the viscosity measured after complete swelling of the cellulose ether solution, the foam inhibitor (a) is dispersed in this solution and, after addition of the carrier salts and optionally water, the homogenized dispersion is spray-dried, characterized in that the percentage content of component (a) is between 7.5 and 18% by weight and component (c) is phosphate-free and consists of a mixture of sodium silicate, sodium carbonate and sodium sulfate.

The foam inhibitor (component a) may be selected from typical organopolysiloxanes containing fine-particle silica which may even be silanized. The content of silica or silanized silica in these known foam inhibitors is normally between 0.5 and 10% by weight and mostly between 1 and 6% by weight. Mixtures of foam inhibitors such as these with paraffins, such as paraffin oils, soft and hard paraffins and microcrystalline paraffin waxes, are also suitable. They may also contain silanized silica.

Particularly preferred foam inhibitors are silica-containing dimethyl polysiloxanes and mixtures thereof with foam-inhibiting paraffin waxes, including microparaffin waxes. In mixtures such as these, the percentage content of silica-containing polydimethyl siloxanes is preferably at least 30% by weight and, more preferably, at least 50% by weight of the foam-inhibiting agent. The content of foam-inhibiting agent in the granules is between 7.5 and 18% by weight, preferably between 10 and 14% by weight and, more preferably, between 10.1 and 14% by weight.

Component (b) consists of a mixture of (b1) carboxymethyl cellulose sodium salt (CMC) and (b2) at least one compound from the class of nonionic cellulose ethers. Suitable compounds of this class are methyl cellulose, ethyl cellulose and mixed ethers, such as methyl hydroxyethyl cellulose, methyl hydroxypropyl cellulose, methyl hydroxybutyl cellulose and ethyl hydroxyethyl cellulose. Methyl cellulose (MC), methyl hydroxyethyl cellulose (MHEC) or methyl hydroxypropyl cellulose (MHPC) is preferably used in combination with CMC. The CMC normally has a degree of substitution of 0.5 to 0.9 carboxymethyl groups per anhydroglucose unit. The MC general]y contains 1.2 to 2 methyl groups per anhydroglucose unit. The MHEC and the MHPC may contain 0.5 to 2 methyl groups and 0.05 to 0.8 hydroxyethyl groups per anhydroglucose unit.

Particularly preferred components (b2) are mixed ethers of methyl cellulose containing hydroxyethyl or hydroxypropyl groups which are referred to in the foregoing by the abbreviations MHEC and MHPC and which advantageously contain 1 to 1.8 methyl groups and 0.1 to 0.5 hydroxyethyl or hydroxypropyl groups per anhydroglucose unit. Mixtures of CMC and MHEC or of CMC and MHPC are particularly suitable for the production of foam inhibitor concentrates having a high active-substance content and swell to the required level comparatively quickly. Accordingly, they provide for the production of foam inhibitor preparations showing overproportionally high foam-inhibiting activity.

The ratio by weight of CMC to nonionic cellulose ethers is 80:20 to 40:60, preferably 75:25 to 60:40 and, more preferably, 73:27 to 68:32. These mixing ratios have proved to be particularly favorable for the stability of the aqueous foam inhibitor dispersions intended for spray drying.

The cellulose ether mixture is preswollen in water before the foam inhibitor is added. Complete swelling of the aqueous cellulose ether solution takes about 15 to 24 hours at 20° C. and about 1.5 to 4 hours at 40° C. Before addition of the foam inhibitor, swelling should have progressed to such an extent that at least 65% and, more particularly, at least 80% of this final state—reflected in a viscosity maximum—is reached. At a solution temperature of 20° C., the foam inhibitor may be added after 12 to 24 hours; at a solution temperature of 40° C., it may be added after 1 to 3 hours. Later addition does not improve the stability of the dispersion significantly, if at all.

The concentrations of the aqueous cellulose ether solution are best between 2 and 8% by weight and preferably between 3 and 6% by weight and, accordingly, are higher on average than proposed in DE 34 36 194 which has proved successful in particular with relatively high polysiloxane contents.

The foam inhibitor (a) is best dispersed by means of effective stirring and mixing units to prevent any tendency towards separation due to the high salt concentrations. It has also been found to be useful to heat the dispersion to temperatures of 50° to 95° C. Where paraffin waxes are used as the foam inhibitor, the temperature should be at least 70° C. Heating of the dispersion produces an increase in viscosity and facilitates further processing.

The carrier material (component c) consists of a mixture of sodium silicate, sodium carbonate and sodium sulfate. Mixtures of 5 to 15% by weight sodium silicate (composition $Na_2O:SiO_2$=1:2 to 1:3.5), 20 to 60% by weight sodium carbonate and 25 to 65% by weight sodium sulfate have proved to be particularly suitable. These figures are based on the content of anhydrous salts in the foam inhibitor granules. Mixtures of 7.5 to 13% by weight sodium silicate, 25 to 50% by weight sodium carbonate and 30 to 50% by weight sodium sulfate are preferably used. The sodium silicate used preferably has the composition $Na_2O:SiO_2$:=1:2.5 to 1:3.3.

The total content of carrier salt in the foam inhibitor granules is between 70 and 90% by weight and preferably between 75 and 85% by weight.

The heated homogenized dispersion normally has a water content of 40 to 50% by weight and preferably 45 to 48% by weight. It is delivered to a typical spray-drying plant, advantageously with continuous homogenization, for example by pumping through a ring pipe with a homogenizer in between, and is spray-dried by means of nozzles in a free-fall zone through which hot drying gases flow. The temperature of the drying gas, which preferably flows in countercurrent, is normally between 160° and 280° C. at the entrance to the spray-drying tower, the so-called ring duct, and between 70° and 110° C. in the offgas pipe before entry into the dust filter.

The degree of drying is adjusted in such a way that the water content, including the water of hydration, is generally between 3 and 10% by weight and preferably between 3.5 and 7.5% by weight.

The granules obtained have an apparent density of 650 to 800 g/l and a particle size distribution comparable with that of typical granulated or spray-dried detergents. With the stated water content, the preparation shows very good pouring and flow properties. The preparation is easy to incorporate in granular detergents and does not separate during transport and storage of the mixtures. The foam-suppressing properties of the foam inhibitor remain fully intact during processing and also in storage, so that very small quantities of foam inhibitor are sufficient. The solubility of the end products in cold and warm water is comparable with that of typical granular detergent mixtures, so that there is no delay in the development of the inhibitor effect in the practical application of the preparations.

Apart from washing and cleaning preparations, the granules may also be used for other applications, for example for the defoaming of pulps, wastewaters, oil emulsions, dye solutions and in chemical process engineering.

EXAMPLES

The sodium carboxymethyl cellulose (CMC) used in the following Examples contained 0.7 carboxymethyl groups while the methyl cellulose (MC) contained 1.8 methyl groups per anhydroglucose unit. The methyl hydroxyethyl cellulose (MHEC) and the methyl hydropropyl cellulose (MHPC) each contained 1.6 methyl groups and 0.2 hydroxyalkyl groups per anhydroglucose unit.

EXAMPLE 1

An aqueous solution containing 4.6% by weight cellulose ether (ratio by weight Na-CMC: MC=70:30) was allowed to swell for 24 hours at 20° C. Instead of a swelling time of 24 hours at 23° C., a swelling time of 2 or 4 hours at 40° C. was also sufficient. The viscosity of the swollen solutions was more than 90% of the final viscosity.

160 kg of a polysiloxane foam inhibitor (polydimethyl siloxane containing microfine silanized silica) were dispersed in 435 kg of this solution. After heating to 60° C., the solution was mixed with a solution—also heated to 60° C.—containing 574 kg of a 34.9% by weight waterglass solution ($Na_2O:SiO_2=1:3.0$), 142 kg water and 814 kg sodium sulfate (anhydrous). 700 kg sodium carbonate (anhydrous) were then added. Under the effect of the heat of solution and hydration released, the temperature rose to around 70° C. The dispersion (water content 34.2% by weight) was sprayed through nozzles into a spray-drying tower under a pressure of 40 bar with continuous homogenization and dried by hot combustion gases flowing in countercurrent (temperature in the ring duct 250° C.; at the tower exit 98° C.). The composition of the end product was as follows (% by weight):

| | |
|---|---|
| foam inhibitor | 8.0% |
| cellulose ether | 1.0% |
| Na silicate | 10.0% |
| Na sulfate | 40.7% |
| Na carbonate | 35.0% |
| Water | 5.3% |

The particle size of the spray-dried product was between 0.1 and 1.2 mm with a maximum of 0.5 to 0.7 mm. The weight per liter was 700 g/1. The product showed good flow properties with no dust emission. After incorporation in a conventional detergent (0.5 part by Weight product to 99.5 parts by weight detergent), no excessive foaming occurred when the detergent was used in a drum-type washing machine (detergent concentration 7.5 g/1) whereas a comparison product with no foam inhibitor added overfoamed. Identical foam behavior was observed when a mixture of 99 parts by weight detergent and 1 part by weight foam inhibitor granules was used in accordance with Example 2 of DE-A 34 36 194 in the content of 5.5% by weight mentioned therein. Accordingly, foam-inhibiting activity was increased by a factor of 1.4.

EXAMPLE 2

An aqueous solution containing 4.6% by weight cellulose ether (ratio by weight of CMC:MHEC=70:30) was allowed to swell for 20 hours at 20° C. Instead of a swelling time of 20 hours at 20° C., a swelling time of 1.5 to 3 hours at 40° C. was also sufficient. The viscosity of the swollen solutions was more than 90% of the final viscosity.

As described in Example 1, 204 kg of a polysiloxane foam inhibitor (polydimethyl siloxane containing microfine silanized silica) were dispersed in 435 kg of this solution. After heating to 60° C., the dispersion was mixed with a solution—also heated to 60° C.—containing 574 kg of a 34.9% by weight waterglass solution ($Na_2O:SiO_2=1:3.0$), 142 kg water and 770 kg sodium sulfate (anhydrous). 700 kg sodium carbonate (anhydrous) were then added. Under the effect of the heat of solution and hydration released, the temperature rose to around 70° C. The dispersion (water content 34.2% by weight) was sprayed through nozzles into a spray-drying tower under a pressure of 40 bar with continuous homogenization and was dried with hot combustion gases flowing in countercurrent (temperature in the ring duct 250° C.; at the tower exit 98° C.). The composition of the end product is as follows (% by weight):

| | |
|---|---|
| foam inhibitor | 10.2% |
| cellulose ether | 1.0% |
| Na silicate | 10.0% |
| Na sulfate | 38.2% |
| Na carbonate | 34.8% |
| Water | 5.8% |

The particle size of the spray-dried product was between 0.1 and 1.2 mm with a maximum of 0.5 to 0.7 mm. The weight per liter was 710 g/l. The product showed good flow properties with no dust emission. After incorporation in a conventional detergent (0.3 part by weight product to 99.7 parts by weight detergent), only moderate foaming occurred when the detergent was used in a drum-type washing machine (detergent concentration 7.5 g/l). Identical foam behavior was observed when a mixture of 98.7 parts by weight detergent and part by weight foam inhibitor granules was used in accordance with Example 2 of DE-A 34 36 194 in the content of 5.5% by weight mentioned therein. Accordingly, foam-inhibiting activity was increased by a factor of 1.8.

EXAMPLE 3

As described in Example 1, a foam inhibitor consisting of polydimethyl siloxane and silanized silica is dispersed in a swollen solution containing 5% by weight of a mixture of 72 parts by weight Na-CMC and 28 parts MHPC. After addition of aqueous Na silicate solution ($Na_2O:SiO_2=1:3.0$, water content 65.1% by weight), sodium sulfate, sodium carbonate and water, a slurry (temperature 75° C.) having the following composition (in % by weight) was obtained:

| | |
|---|---|
| foam inhibitor | 8.5% |
| cellulose ether | 0.8% |
| Na silicate | 7.5% |
| Na sulfate | 28.0% |
| Na carbonate | 21.3% |
| Water | 33.9% |

After homogenization and spray drying (temperature of the heating gas at the tower entrance 260° C.; at the tower exit 99° C.), free-flowing granules having an apparent density of 720 g/l and the following composition (in % by weight) were obtained:

| | |
|---|---|
| foam inhibitor | 12.0% |
| cellulose ether | 1.1% |
| Na silicate | 10.6% |
| Na sulfate | 39.5% |
| Na carbonate | 30.1% |
| Water | 6.7% |

Compared with the composition product according to DE-A 34 36 194, foam inhibiting activity is higher by a factor of 2 for identical quantities of polysiloxane foam inhibitor.

What is claimed is:

1. A process for the production of phosphate-free pourable foam inhibitor granules comprising the steps of:

A) forming an aqueous solution containing from about 2 to about 8% by weight of a mixture of cellulose material, wherein said mixture of cellulose material consists of sodium carboxymethyl cellulose and at least one nonionic cellulose ether in a ratio of weight of about 80:20 to about 40:60;

B) maintaining the aqueous solution formed in step A) at a temperature in the range of from about 15° to about 60° C. until the viscosity of the solution is at least about 60% of the viscosity obtained by complete swelling of the solution;

C) dispersing in the solution from step B), optionally with the addition of water, the following:

(a) a water-insoluble foam inhibitor consisting essentially of either;

(i) at least one organopolysiloxane containing fine particle silica, or (ii) at least one organopolysiloxane containing fine particle silica in admixture with at least one of paraffin oil and paraffin wax; and (b) a phosphate-free carrier material mixture comprised of from about 5 to about 15% by weight of sodium silicate having the composition $Na_2O$:$SiO_2$ such that the ratio of $Na_2O$ to $SiO_2$ is from about 1:2 to about 1:3.5, from about 25 to about 60% by weight of sodium carbonate, and from about 25 to about 65% by weight of sodium sulfate, wherein the above percentages are based on the anhydrous salts relative to the total weight of said phosphate-free carrier material mixture; and D) spray-drying the dispersion resulting from step c) to form said phosphate-free pourable foam inhibitor granules, wherein said pourable foam inhibitor granules contain from 10.1 to about 18% by weight of said water-insoluble foam inhibitor; from about 0.2 to about 3% of said cellulose material, and from about 70 to about 90% by weight of said carrier material mixture, relative to the total weight of said phosphate-free foam inhibitor granules.

2. The process of claim 1 wherein step C) further comprises the step of heating the dispersion formed therein to a temperature of from about 50° to about 95° C. prior to carrying out step D).

3. The process of claim 2 wherein said phosphate-free foam inhibitor granules contain from about 3 to about 10% by weight of water.

4. The process of claim 3 wherein said phosphate-free foam inhibitor granules contain from about 3.5 to about 7.5% by weight of water.

5. The process of claim 1 wherein said organopolysiloxane is polydimethyl siloxane.

6. The process of claim 5 wherein said fine particle silica in step C) (a) is silanized silica.

7. The process of claim 1 wherein step C) is carried out by the dispersion of said water-insoluble foam inhibitor followed by the dispersion or solution of said phosphate-free carrier material mixture.

8. The process of claim 1 wherein said phosphate-free carrier material mixture comprises from about 7.5 to about 13% by weight of sodium silicate having the composition $Na_2O$:$SiO_2$ such that the ratio of $Na_2O$ to $SiO_2$ is from about 1:2.5 to about 1:3.3, from about 25 to about 50% by weight of sodium carbonate, and from about 30 to about 50% by weight of sodium sulfate; wherein the above percentages are based on the anhydrous salts relative to the total weight of said phosphate-free carrier material mixture.

9. The process of claim 1 wherein in step A) said nonionic cellulose ether is at least one of methyl cellulose, methyl hydroxyethyl cellulose, and methyl hydroxypropyl cellulose in a ratio by weight of sodium carboxymethyl cellulose to said nonionic cellulose ether of from about 75:25 to about 50:50.

10. The process of claim 1 wherein said aqueous solution of step A) contains from about 3 to about 6 grams per liter of said mixture of cellulose material.

11. The phosphate-free pourable foam inhibitor granules produced by the process of claim 1.

12. The process of claim 1 wherein in step D) the pourable foam inhibitor granules contain from 10.1 to about 14% by weight of said water-insoluble foam inhibitor.

13. Phosphate-free pourable foam inhibitor granules consisting essentially of:

(a) from 10.1 to about 18% by weight of a water-insoluble foam inhibitor containing either (i) at least one organopolysiloxane containing fine particle silica, or (ii) at least one organopolysiloxane containing fine particle silica in admixture with at least one of paraffin oil and paraffin wax;

(b) from about 0.2 to about 3% by weight of a mixture of sodium carboxymethyl cellulose and at least one nonionic cellulose and at least one nonionic cellulose ether in a ratio by weight of about 80:20 to about 40:60; and (c) from about 70 to about 90% by weight of a phosphate-free carrier material mixture comprising from about 5 to about 15% by weight of sodium silicate having the composition $Na_2O$:$SiO_2$ such that the ratio of $Na_2O$ to $SiO_2$ is from about 1:2 to about 1:3.5, from about 25 to about 60% by weight of sodium carbonate, from about 25 to about 65% by weight of sodium sulfate, wherein the above percentages are based on the anhydrous salts relative to the total weight of said phosphate-free carrier material mixture.

14. The phosphate-free pourable foam inhibitor granules of claim 13 wherein in component (a) the organopolysiloxane is polydimethyl siloxane.

15. The phosphate-free pourable foam inhibitor granules of claim 14 wherein said nonionic cellulose ether in component (b) is at least one of methyl cellulose, methyl hydroxyethyl cellulose, and methyl hydroxypropyl cellulose, in a ratio by weight of said sodium carboxymethyl cellulose to said nonionic cellulose ether of from about 75:25 to about 50:50; and wherein said phosphate-free carrier material mixture comprises from about 7.5 to about 13% by weight of sodium silicate having the composition $Na_2O:SiO_2$ such that the ratio of $Na_2O$ to $SiO_2$ is from about 1:2.5 to about 1:3.3, from about 25 to about 50% by weight of sodium carbonate, and from about 30 to about 50% by weight of sodium sulfate; wherein the above percentages are based on the anhydrous salts relative to the total weight of said phosphate-free carrier material mixture.

16. The phosphate-free pourable foam inhibitor granules of claim 13 wherein in component (a) from 10:1 to about 14% by weight of water-insoluble foam inhibitor is present in the granules.

* * * * *